G. E. ELIA.
APPARATUS FOR DETECTING AND INDICATING THE PRESENCE OF SUBMARINE BOATS.
APPLICATION FILED DEC. 7, 1916.
1,326,156.
Patented Dec. 23, 1919.
2 SHEETS—SHEET 1.
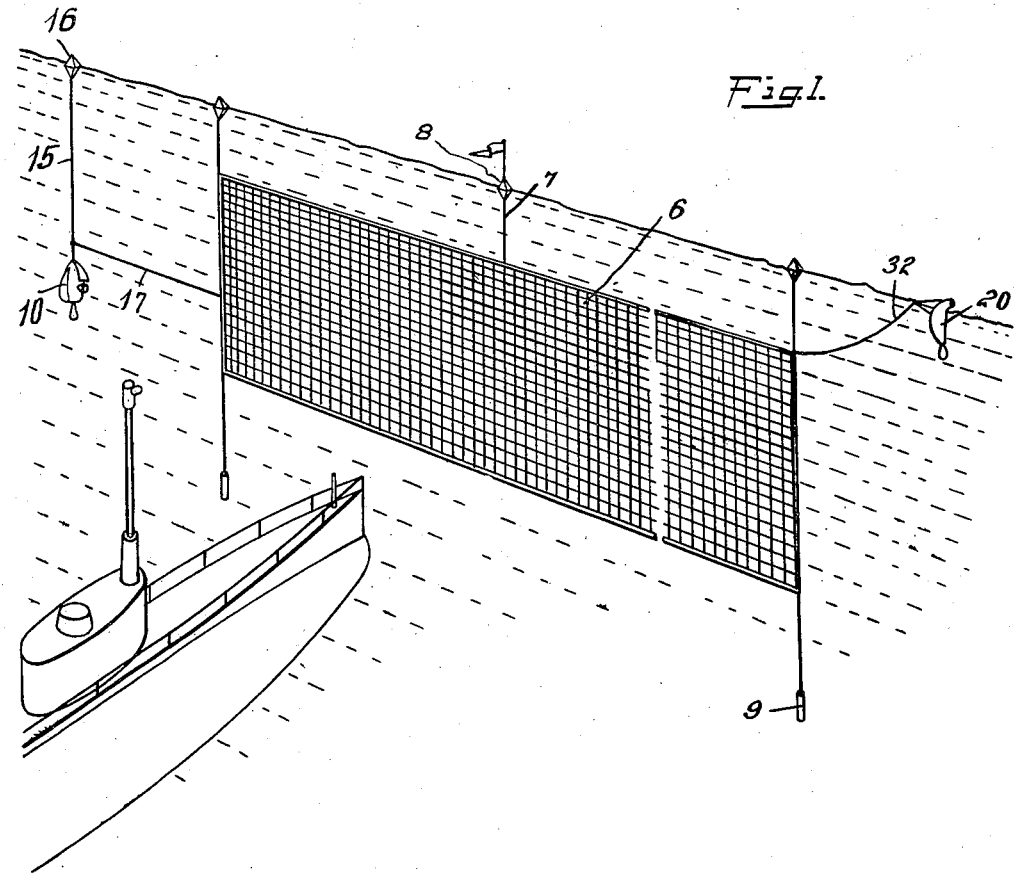
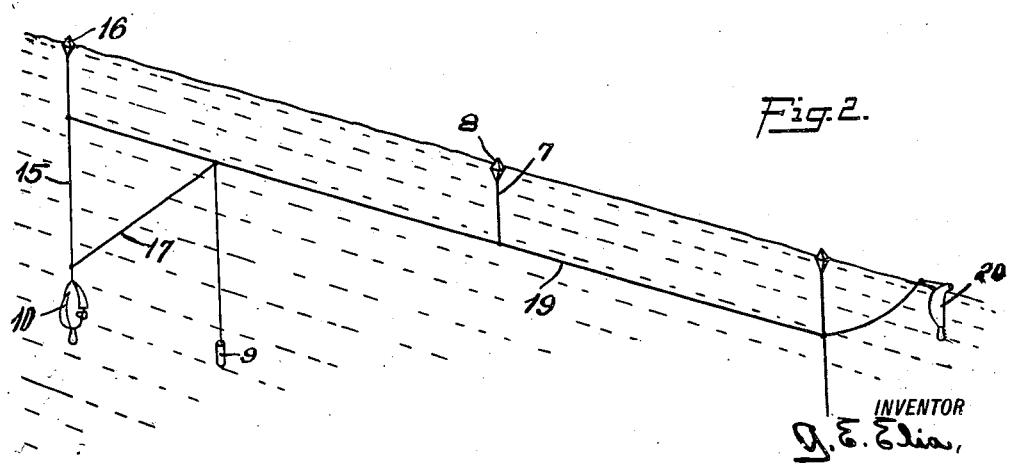

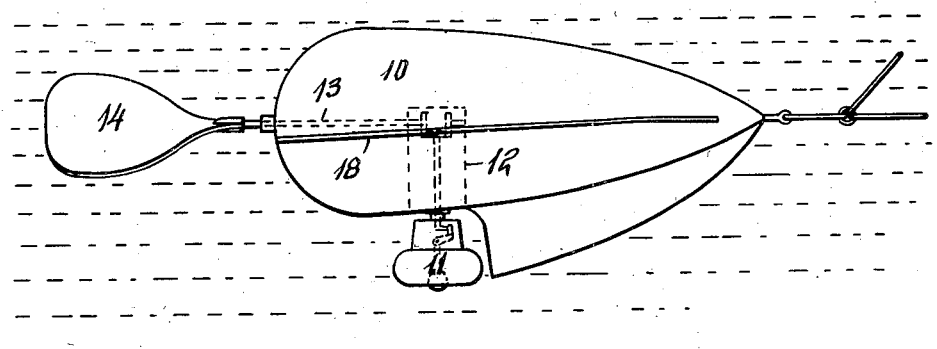
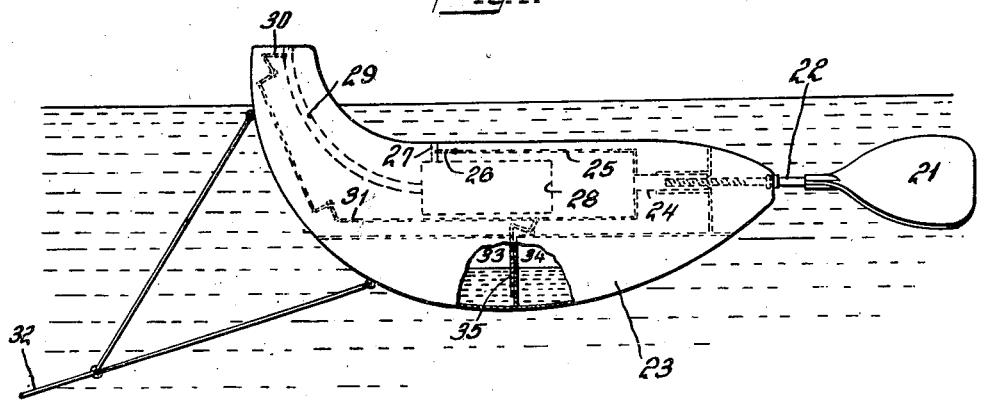
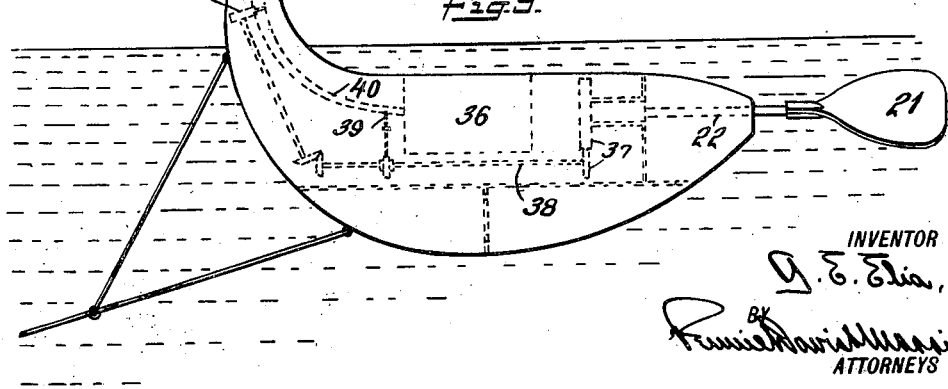

UNITED STATES PATENT OFFICE.

GIOVANNI EMANUELE ELIA, OF LONDON, ENGLAND.

APPARATUS FOR DETECTING AND INDICATING THE PRESENCE OF SUBMARINE BOATS.

1,326,156. Specification of Letters Patent. Patented Dec. 23, 1919.

Application filed December 7, 1916. Serial No. 135,675.

*To all whom it may concern:*

Be it known that I, GIOVANNI EMANUELE ELIA, a subject of the King of Italy, residing at Royal Automobile Club, Pall Mall, London, England, have invented certain new and useful Improvements in Apparatus for Detecting and Indicating the Presence of Submarine Boats; and I do hereby declare the following to be a full, clear, and exact description of the invention, such as will enable others skilled in the art to which it appertains to make and use the same.

This invention is directed to the provision of means for detecting and indicating the presence of submarine boats. The invention involves the provision of a net or cable, or some similar device, adapted to be submerged in the sea and sustained by suitable buoys in a position where it is apt to be engaged by a hostile submarine boat, and signaling devices attached to this net or cable and adapted to give an indication which will enable others to determine the location of the submarine.

It is one of the aims of the invention to provide signaling devices which will send a signal to a great distance to indicate the engagement of a submarine with the net or cable and the approximate location of the boat, and other signaling devices which are effective to give a more exact indication of the location of the submarine, but which are serviceable over only a limited area. For the purpose of sending a signal to a distance to indicate the presence of a submarine in the net, I prefer to employ a submarine signal bell and mechanism for sounding it intermittently. The sound of such a bell struck under water may be detected with a suitable receiving apparatus at a distance of many miles, and by means of the receiving apparatus it is possible to determine approximately the location of the bell. For the purpose of giving the more exact indication of the location of the net with the submarine therein, I prefer to employ visual signals, including signals which may be of the ordinary type visible in daylight, and also special signaling devices which are visible at night.

Another of the features of the invention involves so constructing the signaling devices that their operating mechanisms remain inactive until the net or cable to which they are attached is engaged by a submarine and moved thereby, as, for instance, by being carried along with a moving submarine boat. Such a means for rendering operative a normally inoperative signaling device is employed in connection with both the sound signaling devices and the visual signaling devices. In construction, it may be varied within wide limits. For instance, the signaling device may have an operating mechanism adapted to be actuated by a spring motor, and this motor may be provided with a stop which is released when the signaling device is drawn through the water by a submarine boat which has engaged the net or cable. Or, the movement of the signaling device through the water, instead of releasing an operating mechanism for the signaling device, may be utilized directly for the operation of the signaling device. This may be done by providing the signaling device with a propeller which will be rotated when the signaling device is drawn through the water. This propeller may be connected to the operating mechanism of the signaling device so as to operate it, or to release a mechanism for operating it.

Such a submarine signal bell is capable of sending a signal to a considerable distance, as, for instance, many miles, but the point from which the sound emanates cannot be located by the receiving devices except within relatively wide limits of approximation. To give more accurate information of the location of the net during the daytime, suitable marking buoys may be attached to the net. But as these are useless at night, I employ additional signaling devices adapted to give an indication of the location of the net which are visible at night. For this purpose any suitable form of torch may be employed and in combination therewith a means may be provided for making the torch operative on movement of the net and the signaling device attached thereto through the water when the net is engaged and carried along by a submarine boat. The torch may be of the form comprising a reservoir for an inflammable gas, together with mechanism whereby on movement of the signaling device through the water the gas is released from the reservoir so that it will flow at a prescribed rate to the burner, where it is ignited. Or, the torch may be of the form employing a substance which ignites on contact with water and the movement of the signaling device through the water may be utilized to open a connection whereby water is admitted to the material, and another connection through which the burning material is emitted.

In any case where a signaling device is provided with a propeller or similar mechanism to be actuated by the water when the signaling device is drawn through the water, either to operate the mechanism of the signal or to release an operating mechanism therefor, it is desirable to guard against unintentional operation of the propeller such as might result from the action of the waves or the action of water currents. A simple means for attaining this end involves so balancing the parts of a signaling device that under normal conditions it will assume a position in which the shaft of its propeller is vertical, or, at least, is inclined at a considerable angle to the horizontal. When in this position, the waves, or water currents, would be ineffective to turn the propeller at least to any effective extent. The connection from the net to the signaling device would then be so made that as the signaling device is moved through the water by the net, it will assume a substantially horizontal position so that the water will be effective to turn the propeller.

I have indicated diagrammatically in the accompanying drawings forms of apparatus embodying the features of the invention. I wish it understood, however, that the invention is not restricted to structural features such as the structural features indicated in these drawings, but that the details of construction may be varied within wide limits as may be desired. In these drawings, Figure 1 is a perspective view showing a net submerged and a submarine boat directed toward the net; Fig. 2 is a view corresponding to Fig. 1 except that a cable is shown in place of a net; Fig. 3 is a view of the sound signaling device; Fig. 4 is a view of the visual signaling device for night use, and Fig. 5 is a view corresponding to Fig. 4 but showing a modified form in which the night signaling device may be embodied.

Referring to these drawings, a net is indicated at 6 in Fig. 1 adapted to be submerged in the sea in a position where it is most apt to be engaged by a hostile submarine boat. The net is sustained in position in any suitable manner. In the present instance, I have shown it as suspended by ropes 7 from buoys 8, and its lower edge as held down by suspended weights 9. It will be understood that the specific type of net and the means for holding it in position form no part of the present invention, and that any type of net and sustaining means therefor may be employed in practising the invention.

A signaling device, including a submarine bell, is attached to the net so that if a submarine boat engages the net and carries it along with the boat, the signaling device will be drawn along by the net. Also, the signaling device is provided with an operating mechanism for the bell, which operating mechanism is normally inactive but becomes active when the signaling device is drawn along through the water. For the purpose of operating the clapper of the bell or controlling the mechanism for operating it, I prefer to employ a propeller. In Figs. 1, 2 and 3, this sound-signaling device is indicated at 10. It is provided with a submarine signal bell 11, and within the body of the signaling device is a mechanism 12 for operating the bell. This operating mechanism, which may be of any desired character, is here shown as comprising a rod connected at its lower end with a bell crank lever which, in turn, is connected with the clapper of the bell. The upper end of the rod is connected to a crank provided on a shaft 13 which is mounted for rotation in bearings in the body of the signaling device and which has a propeller 14 mounted upon its end at the stern of the signaling device. When the signaling device is drawn through the water, the propeller 14 is rotated and its shaft 13 operates the mechanism 12 for actuating the clapper of the bell. The mechanism 12 may, however, be of any other suitable type, for example, the stored energy type, such as a spring motor, in which case the rotation of the shaft 13 may serve merely to release the mechanism 12 to permit it to operate the clapper of the bell. In order for the bell 11 to be effective in sending signals to a considerable distance, it should be submerged to a substantial depth, at least twenty feet. In Fig. 1, the signal mechanism including the bell is shown as suspended by a cable 15 from a float 16. Also, there is a substantially horizontal cable connection 17 from the cable 15 to the net 6. As shown in Fig. 1, the signaling device 10 normally assumes a position in which the propeller 14 is lowermost and its shaft is substantially vertical. In this position the propeller will not be affected by currents in the water. When the net 6 is dragged along by a submarine boat, the signaling device 10 is drawn along with it by the cable connection 17, and then the signaling device tends to assume a horizontal position in which the propeller shaft is substantially horizontal and in which the water is effective to turn the propeller. To aid in turning the signaling device to this horizontal position, the body thereof is provided with fins 18 projecting laterally from the sides of the body.

Fig. 2 illustrates a construction similar to that shown in Fig. 1 except that a cable 19 is employed instead of a net 6. This cable is held by buoys in a submerged position at such a depth that it will be engaged by the periscope of a submarine boat when the boat is under way with its periscope exposed.

The buoys 8 serve as signaling devices which are visible in daylight to show the exact location of the net. In addition to these signaling devices, I provide one or more signaling devices adapted to give a signal which is visible at night. Such a signaling device is shown at 20 in Figs. 1 and 2 and illustrated on an enlarged scale in Figs. 4 and 5. The form of visual signal shown in Fig. 4 consists of a floating body carrying a supply of a material, such as calcium phosphid, which, when water is admitted to it, will be consumed and produce a flame. This device is provided with automatic controlling mechanism operated by the movement of the device through the water for opening a passage through which water is admitted to the inflammable material, and through which the flame produced escapes into the atmosphere. For this purpose a propeller is shown at 21 mounted upon a shaft 22 which, within the body 23 of the signaling device, is screw-threaded to co-act with threads on a traveling crosshead 24. This crosshead is connected by a rod 25 to a valve 26 controlling a passage 27 through which water is admitted to a space 28 for the storage of the material for producing the flame. From this space 28 a passage 29 leads to the upper end of the signaling device and to the atmosphere. This passage 29 is controlled by a valve 30 connected by operating mechanism 31 to the crosshead 24. The signaling device as a whole is connected by cable 32 to the obstructing net or cable so that it will be drawn along with the said net or cable. When it is so drawn along the propeller 21 is turned, resulting in movement of the crosshead 24 to the right in Fig. 4 and actuation of the valves 26 and 30. This admits water through the passage 27 to the material in the receptacle 28, and the flame produced is emitted from the end of the passage 29 to the atmosphere to form the signal visible at night.

To guard against operation of the propeller 21, and, hence, of the valves, by currents in the water, I prefer to so construct the signaling device 20 that it will normally assume a position in which the propeller shaft is vertical, as is shown in Figs. 1 and 2. The distribution of weight in the signaling device and the connection of the cable 32 thereto may be such that when the signaling device is drawn along with the net it will assume a horizontal position, as shown in Figs. 4 and 5. If desired, however, I may provide means for shifting the center of gravity of the signaling device when the device is drawn along by the net or cable. For instance, Fig. 4 shows two receptacles 33 and 34 in the lower part of the body 23 of the signaling device. The rear one 34 of these receptacles may be filled with water so as to move the center of gravity of the signaling device aft. Ports connecting the two receptacles 33 and 34 may be controlled by a valve 35 connected to the rod 31, so that when the crosshead 24 is moved to open the valves 26 and 30, the valve 35 will be moved to open communication from the receptacle 34 to the receptacle 33. This will allow water to flow from one receptacle into the other, resulting in movement of the center of gravity of the signaling device forward, so that the device will more readily maintain the substantially horizontal position in which it is shown in Fig. 4.

The modified construction shown in Fig. 5 involves the use of a receptacle 36 for the storage of gas under pressure. The rotation of the propeller shaft 22 is utilized to operate through suitable gearing 37 to rotate a shaft 38. From this shaft 38 connection is made to a valve 39 controlling the flow of gas from the receptacle 36 through a duct 40 which leads to a burner at the outlet end of the duct. The shaft 38 is also connected by suitable gearing to an igniter 41 whereby the gas issuing from the duct 40 is ignited.

I claim:

1. Apparatus for detecting and indicating the position of a submarine boat comprising a barrier of substantial length adapted to be submerged in the sea in such a position as to be engaged by some portion of a submarine boat, and a signaling device connected to the barrier and adapted to be repeatedly actuated to give an indication on being drawn through the water with the barrier when and as often as the latter is engaged by a moving submarine boat; substantially as described.

2. Apparatus for detecting and indicating the position of a submarine boat comprising a barrier of substantial length adapted to be submerged in the sea in such a position as to be engaged by some portion of a submarine boat, a signaling device connected to the barrier so as to be drawn through the water therewith when the barrier is engaged by a moving submarine boat, and means set in motion continuously by the movement of the signaling device with the barrier through the water for operating the device to give an indication; substantially as described.

3. Apparatus for detecting and indicating the position of a submarine boat comprising a barrier of substantial length adapted to be submerged in the sea in such a position as to be engaged by some portion of a submarine boat, a signaling device connected to the barrier so as to be drawn through the water therewith when the barrier is engaged by a moving submarine boat, a propeller on the signaling device, and means actuated by the revolution of the propeller for controlling the operation of the signaling device; substantially as described.

4. Apparatus for detecting and indicating the position of a submarine boat comprising a barrier of substantial length adapted to be submerged in the sea in such a position as to be engaged by some portion of a submarine boat, a signaling device connected to the barrier so as to be drawn through the water therewith when the barrier is engaged by a moving submarine boat, a propeller on the signaling device, and means actuated by the revolution of the propeller for controlling the operation of the signaling device, the signaling device being so constructed that it assumes normally a position in which the propeller shaft is substantially vertical and assumes a position in which the propeller shaft is substantially horizontal when the signaling device is drawn through the water with the barrier; substantially as described.

5. Apparatus for detecting and indicating the position of a submarine boat comprising a barrier of substantial length adapted to be submerged in the sea in such a position as to be engaged by some portion of a submarine boat, and a submarine signaling bell connected to the barrier and adapted to be actuated when and as often as the barrier is engaged and drawn through the water by a moving submarine boat; substantially as described.

6. Apparatus for detecting and indicating the position of a submarine boat comprising a barrier of substantial length adapted to be submerged in the sea in such a position as to be engaged by some portion of a submarine boat, a submarine signaling bell connected to the barrier, and means actuated by the movement of the bell with the barrier through the water for causing the bell to be repeatedly sounded during such movement; substantially as described.

7. The combination of a barrier of substantial length adapted to be submerged in the sea in such a position as to be engaged and drawn through the water by some portion of a moving submarine boat, and a signaling device connected to be towed with and by the barrier and adapted to be actuated when and as often as the barrier is so engaged and towed; said signaling device comprising a signal, and a member adapted to be set in motion by the passage of the signaling device through the water and connected to control the operation of the signal, substantially as described.

8. The combination of a barrier of substantial length adapted to be submerged in the sea in such a position as to be engaged and drawn through the water by some portion of a moving submarine boat, and a signaling device connected to be towed with and by the barrier and adapted to be actuated when said barrier is so engaged and towed; said signaling device comprising a body, a signal carried thereby, and a controller also carried by said body adapted to be set in motion by the passage of the signaling device through the water and connected to bring said signal into action; substantially as described.

9. The combination of a barrier of substantial length adapted to be submerged in the sea in such a position as to be engaged and drawn through the water by some portion of a moving submarine boat, and a signaling device connected to be towed with and by the barrier and adapted to be actuated when said barrier is so engaged and towed; said signaling device comprising a hollow body, a signal carried thereby, a member connected to said body and adapted to be set in motion by and during the passage of the signaling device through the water, and means disposed within said body and controlled by the motion of said member for bringing the signal into action; substantially as described.

10. The combination of a barrier of substantial length adapted to be submerged in the sea in such a position as to be engaged and drawn through the water by some portion of a moving submarine boat, and a signaling mechanism comprising an element connected to be towed with and by the barrier and adapted to be brought into action automatically by such towing movement and for a period lasting at least as long as said movement continues; substantially as described.

11. The combination of a barrier of substantial length adapted to be submerged in the sea in such a position as to be engaged and drawn through the water by some portion of a moving submarine boat, and a signaling device connected to be towed with and by the barrier and adapted to be actuated when said barrier is so engaged and towed; said signaling device comprising a signal, a member adapted to be set in motion by and during the movement of the signaling device through the water and for a period lasting at least as long as such movement continues, and mechanical connections between said member and said signal for bringing the latter into action and for controlling its action; substantially as described.

12. The combination of a barrier of substantial length adapted to be submerged in the sea in such a position as to be engaged and drawn through the water by some portion of a moving submarine boat, and a signaling mechanism comprising an element connected to be towed with and by the barrier, said signaling mechanism being operable automatically by and consequent upon such towing movement of said element; substantially as described.

13. The combination of a barrier of substantial length adapted to be submerged and drawn through the water by some portion of a moving submarine boat, and a signaling mechanism comprising a controlling device which is movable with the barrier through the water and which is automatically set in action by such movement, and a device for emitting a signal connected with said controlling device to be operated when the latter is thus brought into action; substantially as described.

14. The combination of a barrier of substantial length adapted to be submerged in the sea in such position as to be engaged and drawn through the water by some portion of a moving submarine boat, and a signaling mechanism comprising an element connected to be towed with and by the barrier, said signaling mechanism being operable automatically each time such towing movement occurs; substantially as described.

15. The combination of a barrier of substantial length adapted to be submerged in the sea in such position as to be engaged and drawn through the water by some portion of a moving submarine boat, and a signaling mechanism comprising an element to be towed with and by the barrier, said signaling mechanism being operable automatically at each occurrence of such towing movement and for a period lasting at least as long as said movement continues; substantially as described.

In testimony whereof I affix my signature.

GIOVANNI EMANUELE ELIA.